US009596840B1

(12) United States Patent
Bourquin

(10) Patent No.: US 9,596,840 B1
(45) Date of Patent: Mar. 21, 2017

(54) ORGANIC WEED REMOVAL APPARATUS AND SYSTEM

(71) Applicant: Daniel T. Bourquin, Colby, KS (US)

(72) Inventor: Daniel T. Bourquin, Colby, KS (US)

( * ) Notice: Subject to any disclaimer, the term of this patent is extended or adjusted under 35 U.S.C. 154(b) by 0 days.

(21) Appl. No.: 14/963,981

(22) Filed: Dec. 9, 2015

Related U.S. Application Data

(60) Provisional application No. 62/090,755, filed on Dec. 11, 2014.

(51) Int. Cl.
*A01B 39/00* (2006.01)
*A01M 21/02* (2006.01)
*A01B 39/18* (2006.01)

(52) U.S. Cl.
CPC ............. *A01M 21/02* (2013.01); *A01B 39/18* (2013.01)

(58) Field of Classification Search
CPC ...... A01B 39/18; A01B 39/085; A01D 33/06; A01D 47/00; A01D 25/044; A01D 34/8355; A01M 21/00; A01M 21/02
USPC .............................. 56/1, 14.3, 51; 171/40, 58
See application file for complete search history.

(56) References Cited

U.S. PATENT DOCUMENTS

| 1,538,829 | A | * | 5/1925 | Larson | A01B 39/18 171/58 |
| 3,990,519 | A | * | 11/1976 | Ernst | A01D 33/06 171/40 |
| 4,027,733 | A | * | 6/1977 | Eisenhardt | A01B 39/18 171/58 |
| 4,183,411 | A | * | 1/1980 | Bourquin | A01B 39/18 171/58 |
| 4,250,697 | A | * | 2/1981 | Bray | A01D 47/00 171/58 |
| 4,459,796 | A | * | 7/1984 | Stokes | A01D 34/8355 56/14.3 |
| 5,354,003 | A | * | 10/1994 | Stokes | A01D 34/8355 241/101.763 |

* cited by examiner

*Primary Examiner* — Robert Pezzuto
(74) *Attorney, Agent, or Firm* — Phillips Murrah PC; Martin G. Ozinga

(57) ABSTRACT

The invention provides a mechanical device to assist in weed removal from crops in an organic manner by mechanically pulling weeds by use of a rotating member to grasp and pull weeds from the soil while leaving the desired crop in place. The rotating members may be wheels, metal rollers, and combinations thereof removably attached to a tractor wherein one rotating member is an inflated rubber tire and the second rotating member is a metal roller wrapped with a rubber lagging and may include a posi-pull system.

2 Claims, 7 Drawing Sheets

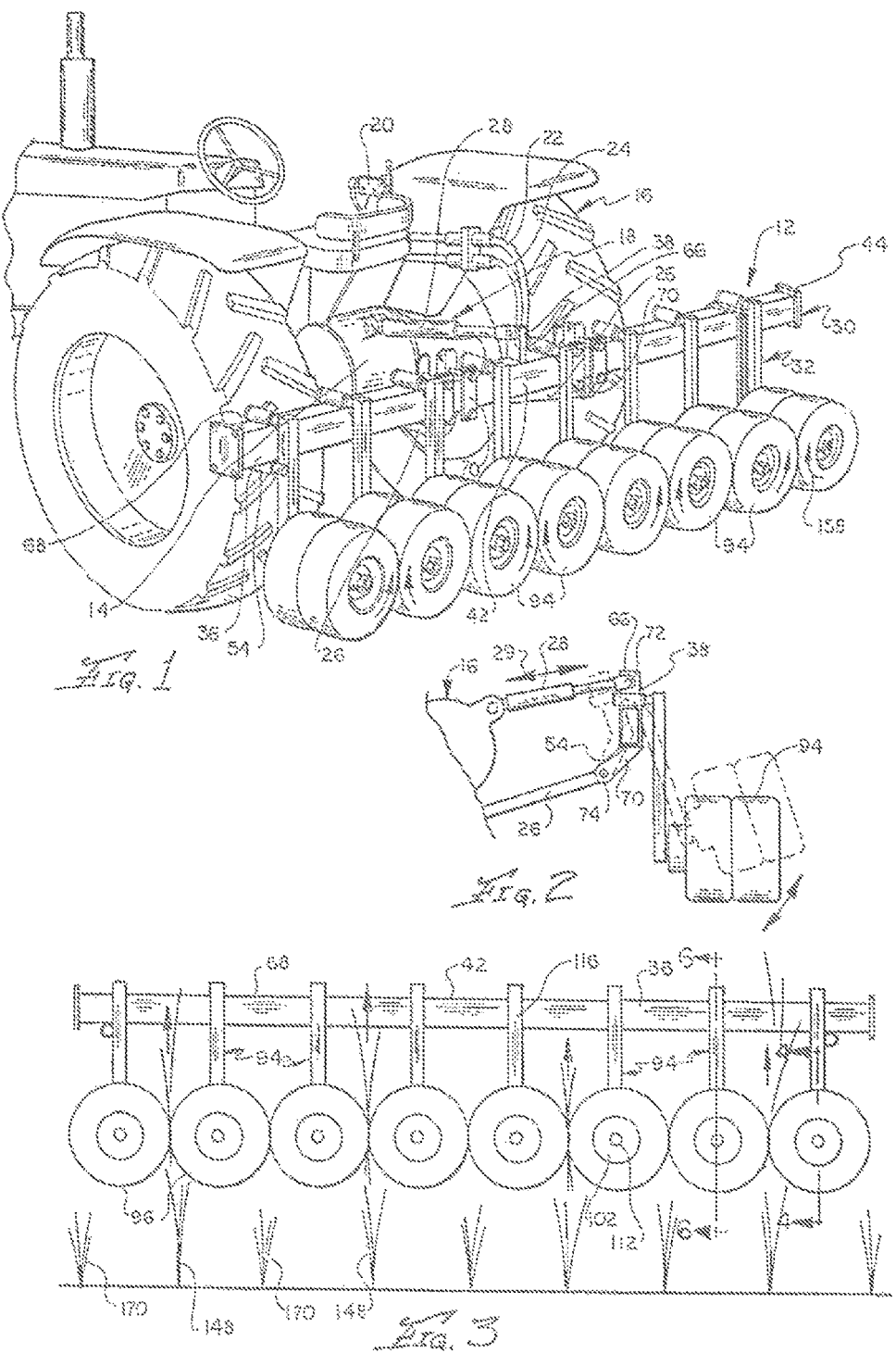

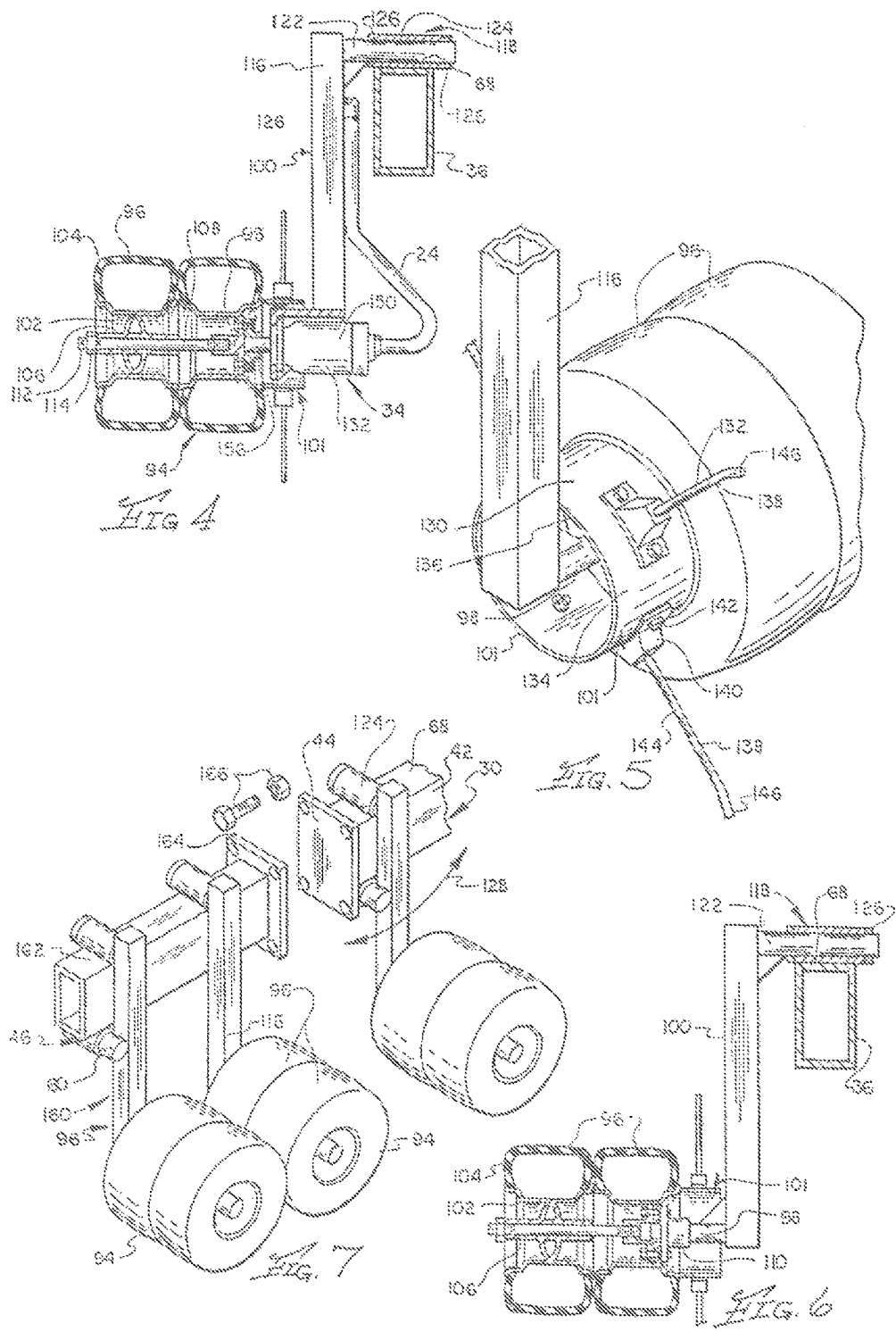

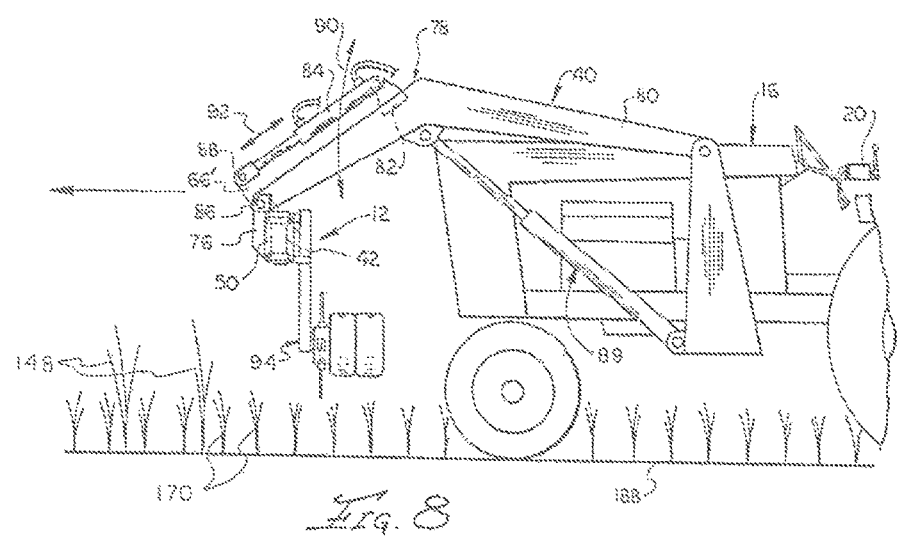
Fig. 8
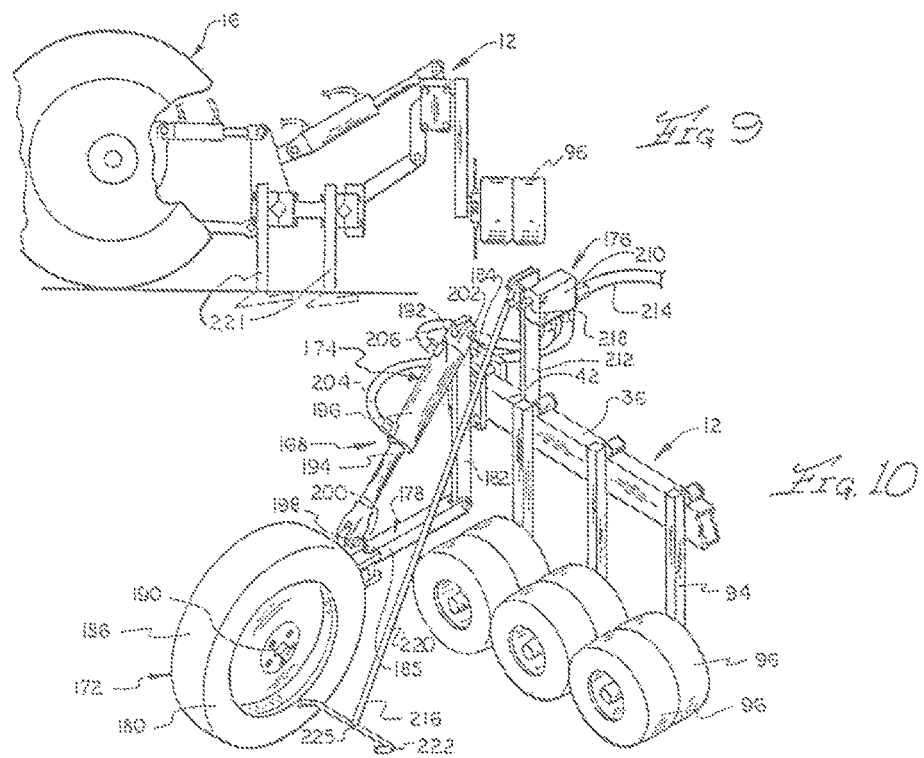
Fig. 9
Fig. 10

ORGANIC WEED REMOVAL APPARATUS AND SYSTEM

CROSS-REFERENCE TO RELATED APPLICATIONS

Priority is claimed from provisional patent application U.S. Ser. No. 62/090,755 filed on Dec. 11, 2014 and incorporated by reference herein.

BACKGROUND OF THE INVENTION

1. Field of the Invention

In general, the present invention relates to an apparatus and method for removing weeds from farming crops. More particularly, the invention provides a mechanical means to assist in weed removal from row crops in an organic manner by mechanically pulling weeds by use of two rotating members in contact to grasp and pull weeds from the soil while leaving the desired crop in place wherein one rotating member is an inflated rubber tire and the second rotating member is a rubber type material having a hard substrate such as a metal roller wrapped with a rubber lagging. Furthermore, the current invention provides for a posi-pull system.

2. Description of the Prior Art

Weed management has always been challenging in the production of crops due to the general nature of farming. Demand for non-chemical weed removal in farming is ever increasing as the desire for more organic food supplies becomes more popular. Traditional weed management with chemicals is, therefore, becoming more in disfavor as the public desire to reduce chemical use in all aspects of farming.

In specific to organic farming, farmers are relying on combinations of cover crops, flame weeding, and other known cultural practices. Needless to say, these prior art methods have numerous disadvantages and risks.

U.S. Pat. No. 4,183,411 issued on Jan. 15, 1980 to Daniel T. Bourquin, the same inventor of this current application, generally discloses an apparatus for pulling weeds in an organic fashion by a mechanical means. The prior art generally provides for two tires working in combination and only two tires. Furthermore, this prior art does not allow for independent placement and tensioning of the pairs of rotating pullers. The current invention is a new and non-obvious improvement over the same.

As the demand increases for more organic food supplies, today's farmers are looking for new means to simultaneously reduce tillage passes and suppress weeds. The prior art devices and methods have failed to bridge the gap between industry needs and the currently available alternatives. Therefore, an extensive opportunity for advancements and innovation remains where the prior art fails or is deficient.

SUMMARY OF THE INVENTION

In view of the foregoing disadvantages inherent in the known types of weed control equipment and systems now present in the prior art, the present invention provides a new and improved system and method wherein the same can be utilized in those situations where safety, cost, and ease of implementation are desired. As such, the general purpose of the present invention, which will be described subsequently in greater detail, is to provide a new and improved weed removal apparatus and system for use with row crops, which has all the advantages of the prior art and none of the disadvantages.

To attain this, the present invention essentially comprises a rotating member, wheel, and or reel that passes over the crop, engages the undesirable weed, and pulls the weed from the soil and wherein a plurality of hydraulically driven cooperating wheel members having outer surfaces thereof in contact to grasp and pull weed members from the adjacent soil. Further, it may be raised or lowered from as desired by an operator to selectively engage the weeds at a desired height. It is contemplated that instead of using two tires that rotate in contact, to utilize two rotating members wherein one rotating member is an inflated rubber tire and the second rotating member is a rubber type material having a hard substrate such as a metal roller wrapped with a rubber lagging.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved agriculture weed removal apparatus and system for assisting in the removal of weeds in fields, which leaves the desired crop intact and unharmed.

It is a further object of the present invention to provide a new and improved agriculture weed removal apparatus and system, which is of a durable and reliable implementation.

An even further object of the present invention is to provide a new and improved agriculture weed removal apparatus and system, which is susceptible to a relatively low cost of operation. Accordingly, is then susceptible to low prices of use to the farming industry, thereby making such economically available to the consuming industry.

Still another object of the present invention is to provide a new and improved agriculture weed removal apparatus and system, which provides all of the advantages of the prior art, while simultaneously overcoming some of the disadvantages normally associated therewith.

Another object of the present invention is to provide a new and improved agriculture weed removal apparatus and system that can be readily adapted to existing equipment used in the field and can also selectively be attached to a front or rear portion of a farm tractor in an easy manner.

A further object of the present invention is to provide a new and improved agriculture weed removal apparatus and system, which may be utilized with standard tractors found in the industry and or utilized as a single unit device.

Still yet, another object of this invention is to provide a new and improved agriculture weed removal apparatus and system that reduces tillage passes, suppresses weeds, and allows for variable height adjustments.

It is even a further object of the present invention to provide a new and improved agriculture weed removal apparatus and system, which is more environmentally friendly than existing means for weed eradication.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings, illustrations, pictures, and appendices.

FIG. 1 is an illustration of a preferred embodiment of the invention generally depicting a perspective view of the weed puller apparatus of this invention shown as rear mounted on a farm tractor, which is partially illustrated.

FIG. 2 is an illustration of a preferred embodiment of the invention generally depicting a fragmentary side elevational view of the weed puller apparatus and farm tractor shown in FIG. 1 illustrating vertical movement of the weed puller apparatus in dotted lines.

FIG. 3 is an illustration of a preferred embodiment of the invention generally depicting a schematic rear, elevational view of the weed puller apparatus of this invention as applied to a weed pulling operation.

FIG. 4 is an illustration of a preferred embodiment of the invention generally depicting an enlarged sectional view taken along line 4-4 in FIG. 3.

FIG. 5 is an illustration of a preferred embodiment of the invention generally depicting an enlarged fragmentary perspective view of a weed pulling assembly of the weed puller apparatus of this invention.

FIG. 6 is an illustration of a preferred embodiment of the invention generally depicting a sectional view taken through line 6-6 in FIG. 3.

FIG. 7 is an illustration of a preferred embodiment of the invention generally depicting a perspective view of a weed pulling attachment assembly illustrating possible connection to one end of the weed puller apparatus of this invention.

FIG. 8 is an illustration of a preferred embodiment of the invention generally depicting a side elevational view of the weed puller apparatus of this invention shown as front mounted on a farm tractor, which is partially illustrated.

FIG. 9 is an illustration of a preferred embodiment of the invention generally depicting a side elevational view of the weed puller apparatus mounted on a rear portion of a farm tractor similar to FIG. 2 and including cultivator members mounted thereon to work the soil.

FIG. 10 is an illustration of a preferred embodiment of the invention generally depicting a fragmentary perspective view of a weed puller apparatus of this invention having a weed pulling attachment assembly connected thereto.

DETAILED DESCRIPTION OF THE PREFERRED EMBODIMENTS

Figure 11:
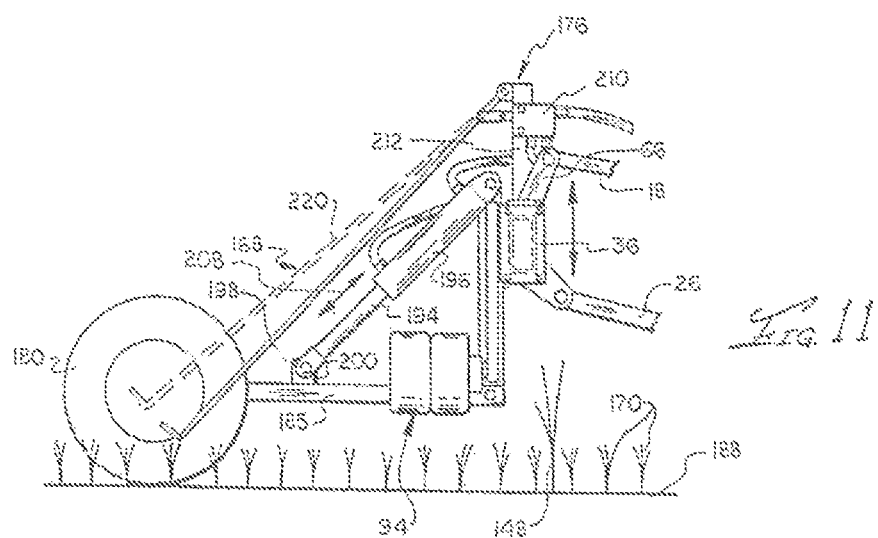
FIG. 11 is an illustration of a preferred embodiment of the invention generally depicting a side elevational view of the weed puller apparatus and weed pulling attachment assembly shown in FIG. 9.

U.S. Pat. No. 4,183,411 issued on Jan. 15, 1980 to Daniel T. Bourquin, the same inventor of this current application, generally discloses an apparatus for pulling weeds in an organic fashion by a mechanical means. The current invention is a new and non-obvious improvement over the same as discussed below and the new and non-obvious improvements are more specifically described under the heading "Other Embodiments".

Referring now to the drawings and to FIG. 1 in particular, reference character 12 generally designates a new and improved mechanical apparatus and system for weed removal or weed puller apparatus (hereinafter referred to collectively as invention 12). It is understood that the invention may be used in other applications other than specifically to weed removal utilities, thus, the title of the invention should not be considered to limit the scope of the invention. Invention 12 may also be used in various farming such as but not limited to vegetable crops, row farming in general, weed removal in general and so forth. Furthermore, it is contemplated that invention 12 may be retrofitted to existing machines, made in conjunction with new machines, permanently attached, removably attached, and combinations thereof.

Invention 12 may be used in multiple applications where it is desired to remove unwanted growth from soil. Likewise, invention 12 may be utilized specifically with tractors and other equipment wherein hydraulic power may be provided. It is understood that other farm equipment could be used not associated with the aforementioned. It is further contemplated that invention 12 may be utilized as a stand-alone unit or attached to existing equipment on the front or rear.

As shown in FIG. 1, a weed puller apparatus of this invention, indicated generally at 12, is shown as attached to a rear portion 14 of a farm tractor 16. More particularly, the farm tractor 16 is of a conventional nature having a three-point hitch assembly 18 and a hydraulic control valve 20 operable selectively to convey pressure fluid through a first line 22 and back to a fluid reservoir (not shown) through a second line 24 or vice versa. The pressure fluid may be generated by an auxiliary hydraulic pump and motor assembly or, as in this illustration, supplied through the hydraulic control valve 20 from a hydraulic pump built into the farm tractor 16.

The three-point hitch assembly 18 is typical including a pair of parallel support arms 26 and an upper central piston and cylinder assembly 28. The support arms 26 are pivoted to raise and lower the weed puller apparatus 12 by use of the hydraulic control valve 20 and movement of the piston and cylinder assembly 28. The piston and cylinder assembly 28 is operable under fluid pressure from the hydraulic control valve 20 to selectively tilt the weed puller apparatus 12 as shown by solid and dotted lines in FIG. 2 when the piston and cylinder assembly 28 is activated as shown by arrow 29.

The basic weed puller apparatus 12 includes (1) a main support means 30 connectable to the three-point hitch assembly 18; (2) a weed pulling means 32 secured to the main support means 30; and (3) a power means 34 operably connected to the hydraulic control valve 20 and the weed pulling means 32. The main support means 30 includes a main support member 36 having mounted thereon a rear end connector assembly 38 in FIG. 1 and a front end connector assembly 40 mounted thereon in FIG. 8.

The main support member 36 includes an elongated rectangular tube member 42 having connector plates 44 and lock arm assemblies 46 secured to opposite ends thereof. Each connector plate 44 extends vertically and has four (4) holes therein for connection thereto of an auxiliary weeding device to be explained (FIG. 7).

Figure 12:
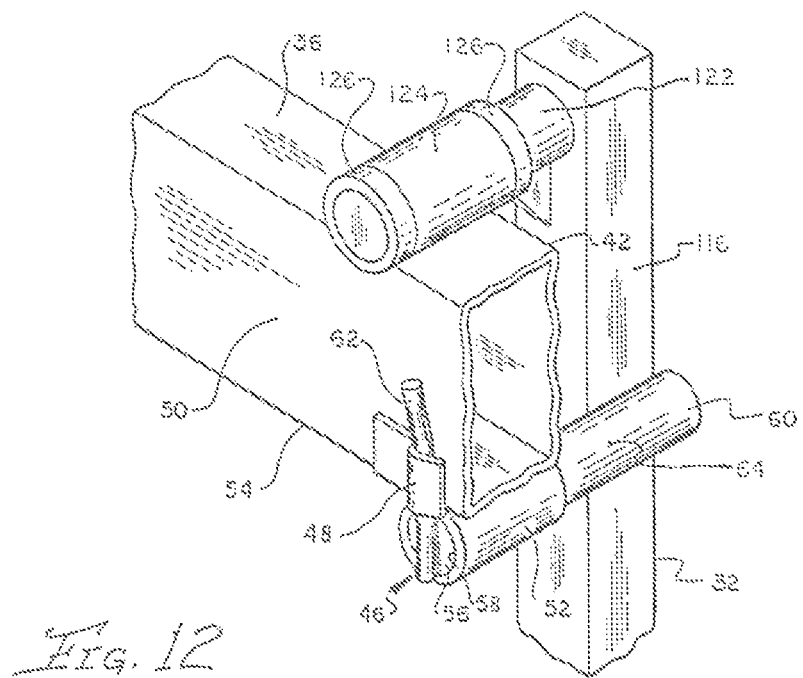
FIG. 12 is an illustration of a preferred embodiment of the invention generally depicting a perspective view of a lock arm assembly of the weed puller apparatus of this invention.

As best shown in FIG. 12, the lock arm assembly 46 includes (1) a lock plate 48 secured to a sidewall 50 of the tube member 42; (2) a connector tube 52 secured to a bottom wall 54 of the tube member 42; and (3) a latch arm 56 operably associated with the lock plate 48 and the connector tube 52. The connector tube 52 is an open cylinder having a central hole 58 there through.

The latch arm 56 is a rod member 60 having a handle member 62 welded at one end of the rod member 60 and extended perpendicular thereto.

In the assembled condition, the rod member 60 is inserted through the connector tube 52 with an outer end 64 engageable with outer ones of the weed pulling means 32 for reasons to be explained. The handle member 62 is engageable with the lock plate 48 to hold the rod member 60 against axial movement. The entire latch arm 56 is removed from the connector tube 52 while performing maintenance on the weed pulling means 32.

The rear end connector assembly 38 includes (1) a tilt control plate 66 secured mid-way of a top surface 68 of the tube member 42; and (2) a pair of spaced, parallel support plates 70 secured to the bottom wall 54 of the tube member 42. As noted in FIG. 2, the tilt control plate 66 is connectable by a pin member 72 to the piston and cylinder assembly 28 for tilting movement of the entire weed puller apparatus 12. Also, the support plates 70 are connected by pins 74 to respective ones of the support arms 26 to raise and lower the entire weed puller apparatus 12.

As best noted in FIG. 8, the front end connector assembly 40 includes (1) a tilt control plate 66' and (2) a pair of spaced, parallel support plate members 76 secured to the sidewall 50 of the tube member 42. When mounting on a front portion of the farm tractor 16, a front loader assembly 78 is used having spaced, parallel lift arms 80; a base plate 82 extended between the lift arms 80; and a control piston and cylinder assembly 84 mounted on the base plate 82. The lift arms 80 are connected by pins 86 to the respective support plate members 76 and the control piston and cylinder assembly 84 is connected by a pin 88 to the tilt control plate 66.

It is obvious that the lift arms 80 are movable by the control valve 20 to actuate a piston and cylinder assembly 89 on the tractor 16 as shown by an arrow 90 to raise and lower the weed puller apparatus 12 when in the front mounted condition. Also, the control piston and cylinder assembly 84 is movable as shown by an arrow 92 by the control valve 20 to tilt the weed puller apparatus 12.

The weed pulling means 32 includes cooperating pairs of weed pulling assemblies 94, namely, four (4) thereof, operable to simultaneously weed four separate rows in a manner to be described. As each weed pulling assembly 94 is substantially identical, only one need be described in detail.

As shown collectively in FIGS. 4, 5, and 6, each weed pulling assembly 94 includes (1) a pair of adjacent wheel members 96; (2) a support shaft assembly 98 to rotatably support the wheel members 96 thereon; (3) a support arm assembly 100 connected at a lower end to the support shaft assembly 98 and at an upper end to the top surface 68 of the main support member 36; and (4) a guard and alignment assembly 101 mounted between the support shaft assembly 98 and the support arm assembly 100.

Each wheel member 96 resembles a conventional tire structure having a support hub 102 with a tire member 104 mounted thereon. Each support hub 102 has a central bearing sleeve 106 so as to be readily rotatable on the support shaft assembly 98. The adjacent support hubs 102 are preferably connected to each other for conjoint rotation.

Each support shaft assembly 98 includes a shaft member 108 extended through the bearing sleeve 106 and connected to a bearing member 110 to allow rotation of the wheel members 96. An outer end 112 of the shaft member 108 is threaded to receive a lock nut 114 thereon. The other end of the shaft member 108 is connected to a lower end of the support arm assembly 100, which extends perpendicular therefrom.

The support arm assembly 100 includes a square tubular support member 116 having a bearing support assembly 118 connected to an upper end 120 thereof. The bearing support assembly 118 includes (1) a connector shaft 122 with one end secured to the support member 116; (2) a bearing sleeve member 124 mounted about the connector shaft 122 and welded to the top surface 68 of the main support member 36; and (3) bearing end plates 126 secured to the connector shaft 122 at opposite ends of the bearing sleeve member 124 to prevent relative axial movement of the connector shaft 122 permitting pivotal movement as shown by arrow 128 in FIG. 7. It is noted that each entire weed pulling assembly 94 is pivotal about the bearing sleeve member 124 as shown by arrow 128 for reasons to become obvious (FIG. 7).

As shown in FIG. 5, each guard and alignment assembly 101 includes a cylindrical guard member 130 secured to an outer periphery of the inner wheel member 96 at the hub 102 and a plurality, namely four, of spike assemblies 132 secured to and equally spaced about an outer surface 134 of the guard member 130. The guard member 130 has an outer edge 136 positioned adjacent the support member 116 and acts as a shield or guard to prevent weed members 148 from becoming entangled about the support shaft assembly 98.

Each spike assembly 132 includes a spike or finger member 138 connected to a support clamp 140 which, in turn, is secured by nut and bolt members 142 to the guard members 130. The spike member 138 is formed with a central body 144 integral with an inclined outer end portion 146.

The support clamp 140 is constructed of a flexible material such as rubber so that the spike member 138 acts to pick up and straighten weed members 148 but will flex without breaking when hitting rocks and other such obstacles.

As shown in FIG. 4, the power means 34 includes a drive assembly 150, which can be mounted on one of the weed pulling assemblies 94. More particularly, the drive assembly 150 is a hydraulic motor member 152 selectively supplied with pressure fluid from the control valve 20 on the farm tractor 16 or an auxiliary supply. The pressure fluid is conveyed to and from the motor member 152 by the first and second lines 22, 24. The motor member 152 drives a power shaft 156, which in turn, is connected to the shaft member 108 of the support shaft assembly 98.

It is obvious that rotation of the power shaft 156 drives the dual wheel members 96 in a direction shown by an arrow 158 in FIG. 1. The contacting outer surfaces of the tire or wheel members 96 act to power adjacent ones thereof. This operates for adjacent pairs of the wheel members 96 to rotate the surfaces there between in an upward direction for a weed pulling operation to be explained.

As shown in FIG. 7, an additional weed pulling attachment assembly 160 may be added to each end of the weed puller apparatus 12 to increase same from a 4 row to a 6 row weeder structure. The weed pulling attachment assembly 160 includes a tube member 162 having an end plate 164 to be secured by nut and bolt members 166 to respective end connector plate 44 of the main support means 30.

A pair of previously described weed pulling assemblies 94 are connected to the tube member 162. Also, it is noted that the lock arm assembly 46 is needed to provide a stop by the rod member 60 to keep sufficient frictional contact between adjacent pairs of the wheel members 96. It is noted that an 8 row weeder structure can be provided merely by joining together two of the basic weed puller apparatuses 12.

An attachment for the weed puller apparatus 12 of this invention, as shown in FIGS. 10 and 11, is a crop level sensing control means 168 to automatically raise and lower the weed puller apparatus 12 to assure that only the weed members 148 and not a crop member 170 is pulled. The crop level sensing control means 168 includes (1) a wheel support assembly 172, one each connected to opposite ends of the main support member 36; (2) a wheel actuator assembly 174 connected to each wheel support assembly 172; and (3) a crop level sensing assembly 176 connected at one end of the main support member 36.

The wheel support assembly 172 includes a connector assembly 178 supporting a wheel member 180. The connector assembly 178 includes (1) a vertical support post 182 secured by a connector clamp 184 to the tube member 42; and (2) a lateral support arm 185 having one end pivotally connected to a lower end of the vertical support post 182 and an outer end connected to the wheel member 180.

The wheel member 180 has a tire member 186 to contact a support surface 188 and a central hub member 190. The outer end of the lateral support arm 185 is connected to the hub member 190 in a manner as by a bearing member to allow rotation of the wheel member 180.

The wheel actuator assembly 174 is a piston and cylinder assembly 192 having a piston member 194 mounted in a cylinder member 196. The piston member 194 has an outer end connected by a pin 198 to a support lug 200 on the lateral support arm 185. An upper end of the cylinder member 196 is pivotally connected by a pin member 202 to the vertical support post 182.

The cylinder member 196 is supplied with pressure fluid through lines 204 and 206 to move the piston member 194 in a conventional manner as shown by an arrow 208. Obviously, such movement would raise and lower the wheel member 180 and interconnected weed puller apparatus 12. The lines 204 and 206 are connected to the crop level sensing assembly 176 to control operation of the wheel support assembly 172.

The crop level sensing assembly 176 includes (1) a control valve 210 mounted on a support member 212 which is secured to the tube member 42; (2) a control fluid supply line 214 connected to the control valve 210; and (3) a sensing arm member 216 operably connected to the control valve 210.

The control valve 210 is of a type having a plunger member 218 to restrict, increase, or block a fluid opening therein to direct fluid pressure selectively to lines 204 and 206 to raise and lower the wheel support assembly 172. Numerous such control valves 210 are known to the prior art.

The sensing arm member 216 resembles a rake structure having an elongated main body 220 with an upper end pivotally connected to the control valve 210 and a lower end connected to a sensor member 222. The upper end of the main body 220 is also connected to the plunger member 218 to cause movement thereof on movement of the sensing arm member 216 as shown in solid and dark lines in FIG. 11.

The sensor member 222 extends laterally of the main body 220 and provides a substantial bottom surface 225 to contact the crop members 170. This causes movement of the plunger member 218 to control fluid pressure flow to the piston and cylinder assembly 192 to automatically raise and lower the weed puller apparatus 12 and maintain a desired height thereof above the crop members 170.

It is noted in FIG. 9 that the weed puller apparatus 12 of this invention can be used in conjunction with soil cultivators 221, which would loosen the soil and permit easier extraction of the weed members 148.

Use and Operation of the Invention

As shown in FIG. 1, the weed puller apparatus 12 is readily attached to the rear portion 14 of the farm tractor 16 through the three-point hitch assembly 18. The parallel support arms 26 and the piston and cylinder assembly 28 are connected to the weed puller apparatus 12 in a conventional manner. The weed puller apparatus 12 is tiltable as shown in dotted lines in FIG. 2 on operation of the piston and cylinder assembly 28 as shown by the arrow 29. The support arms 26 are pivotal to raise the entire weed puller apparatus 12 for transport purposes. Also, the movement of the support arms 26 and the piston and cylinder assembly 28 are coordinated to (1) place the wheel members 96 in a generally vertical or slightly tilted upwardly and rearwardly; and (2) to place the cooperating wheel members 96 at a proper height to miss contact with the crop members 170 but pull the weed members 148 (FIG. 3).

The farm tractor 16 is manipulated to place the center of every other pair of wheel members 96 above the weed members 148 to be pulled as shown in FIG. 3. It is obvious that the basic weed puller apparatus 12 is then operable to simultaneously pull weeds from four (4) rows of weed members 148. The hydraulic control valve 20 is operated to power the hydraulic motor member 152 to drive its wheel members 96 as shown by arrow 158. Each adjacent pair of wheel members 96 are then driven in an opposite direction due to frictional contact there between. The combination of the dual wheel members 96 and their frictional contact is very important as allows one hydraulic motor member 152 to drive the entire cooperating weed pulling assemblies 94. The contacting pairs of wheel members 96 operate to grasp the weed members 148 and pull same upwardly and outwardly of the supporting soil.

The lock arm assemblies 46 are operable to hold the outer ones of the weed pulling means 32 inwardly to assure pressure between the wheel members 96. The respective latch arms 56 are removed from the connector tubes 52 when performing maintenance on the weed pulling means 32. Also, it is noted that frictional contact between the wheel members 96 and, thus adjustment of the weed pulling operation, can be controlled by regulating air pressure in the wheel members 96.

Another important feature of the invention is the use of the guard and alignment assembly 101 associated with the respective inner wheel members 96. The guard members 130 covers the respective support shaft assembly 98 to keep the weed members 148 from becoming entangled thereon. Also, associated with each guard member 130 is the spike assembly 132 having flexible spike members 138 connected thereto. The rotating spike members 138 act to first contact the weed members 148 to pull same upwardly like a raking action for subsequent grasping and pulling out the weed members 148.

As shown in FIG. 7, an additional weed pulling attachment assembly 160 can be secured to each opposite end of the weed puller apparatus 12 to change the structure from a four (4) to a six (6) row weeder structure. The connector plates 44 are secured to the respective end plates 164 by the nut and bolt members 166 in a conventional manner.

Another feature of this invention is shown in FIG. 8, wherein the weed puller apparatus 12 can be connected to a front portion of the farm tractor 16 by the front end connector assembly 40. The lift arms 80 are moved about an arc shown by arrow 90 to raise and lower the weed puller apparatus 12. Also, the control piston and cylinder assembly 84 is movable as shown by the arrow 92 to tilt the weed puller apparatus 12 as desired. The weed puller apparatus 12 operates as previously described for the rear mounted operation. The front mounted operation is desirable for pulling larger weeds such as shatter cane and corn in soybeans and grain sorghum or when pulling velvet leaf and sunflowers.

As noted in FIG. 9, the weed puller apparatus 12 can be used with conventional, earth cultivator structures, indicated at 221, which act to loosen the soil before the weed pulling operation.

As shown in FIGS. 10 and 11, an auxiliary attachment is the crop level sensing control means 168 that can be added to the weed puller apparatus 12 to automatically raise and lower same on sensing height of the crop members 170. The crop level sensing means 168 includes the wheel support assembly 172 connected to opposite ends of the main support member 36 and crop level sensing assembly 176 mounted at one end of the main support member 36. The wheel actuator assembly 174 is connected to each wheel support assembly 172 to raise and lower same.

More specifically, the crop level sensing assembly 176 has the sensing arm member 216, which contacts the crop members 170 and controls fluid pressure movement from a supply line 214 through the control valve 210 to the piston and cylinder assembly 192. Movement of the sensing arm member 216 operates to present pressure fluid through lines 204 or 206 to retract or extend the piston member 194 as noted by the arrow 208. Obviously, this operates to raise and lower the weed puller apparatus 12 having the wheel member 180 contacting the support surface 188.

The weed puller apparatus of this invention presents a compact, durable structure to pull weed members in a unique, efficient manner. The weed puller apparatus is easy to use, simple to connect for front or rearward use on a farm tractor, and substantially maintenance free. The power means uses a power drive on only one weed pulling means to drive eight (8) sets of wheel members. On large weed puller apparatuses of 6-8 or 10 row weed puller structures, a second drive motor or pump may be used as deemed necessary.

Other Embodiments

As stated above, U.S. Pat. No. 4,183,411 issued on Jan. 15, 1980 to Daniel T. Bourquin, the same inventor of this current application generally discloses an apparatus for pulling weeds in an organic fashion by a mechanical means. The current invention is a new and non-obvious improvement over the same. The previous invention essentially utilized two rubber tires that rotated in opposite directions that engaged the weed and pulled the weed up. Depending on variables like the tire pressure, placement of one or both of the tires, tread wear, and dirt accumulation on the tread, it was observed that the two tire combination sometimes let the weed slip through the tires and not be engaged sufficiently to pull the weed up and from the ground for the desired result. Also, depending on variable like the tire pressure and placement of one or both of the tires, the weed top that engaged the tires was cut at the engagement point resulting in leaving the bulk of the weed still in place in the ground. The undesirable air pressure of either one of the tires, wearing of tread on either one of the tires, the lack of sufficient contact between the tires and or too much pressure between the tires would create an undesirable result of not pulling the weed from the ground.

The current invention essentially contemplates to use a softer material such as an inflated rubber tire making contact with a hard substrate such as a metal roller wrapped with a rubber lagging, which improves the performance of the weed pulling wheel wherein the prior art device generally utilized two inflated rubber wheels working together. This provides the ability to eliminate half of the undesirable variables associated with two inflatable tires. It has been found that the tire combination with a roller covered in lagging allows the weed to be more efficiently removed from the soil. Very generally, the softer tire is allowed to push against a harder metal roller for a better engagement of the weed to be pulled. The lagging material on the metal roller generally provides a reduced slip surface for the metal roller.

It has also been discovered that two relatively hard rotating members, essentially meaning two rollers by themselves working in combination are also undesirable because of the inflexibility of the arrangement. The two hard rotating surfaces require a delicate balance that is difficult to achieve because if they are spaced too far apart, the weed slips through. If they are placed too close together, the friction is too great, which may break the weed before being pulled or even cause the rotating members to bind up.

What is needed is a softer rotating member, such as a tire, making contact with a harder rotating member, such as a roller covered in lagging, to provide the optimal combination for allowing the weed to be pushed upward without cutting the weed or letting it slip without it being pulled out of the soil. Furthermore, the current invention provides a new and non-obvious tensioning and mounting system for the opposable rotating members, which will also be described in greater detail below. This allows for a rotating pair to be utilized independently and in multiple combination whereas the prior art device required at least 4 rotating pairs.

It is further contemplated that a tensioning system may allow an individual unit to operate individually and independent of other weed pulling units thus allowing use of the same units on a variety of row widths. Furthermore, the invention may benefit from use of smaller weed pulling units that would allow the invention to operate between rows instead of or in combination with the units designed to pull weeds above the row. The smaller units may be lowered and inserted between the rows thereby allowing pulling weeds from the entire field and or crop. These smaller units may be smaller wheels and rollers that fit between larger units and may function for fields such as cornfields and or other row crops.

Figure 13:
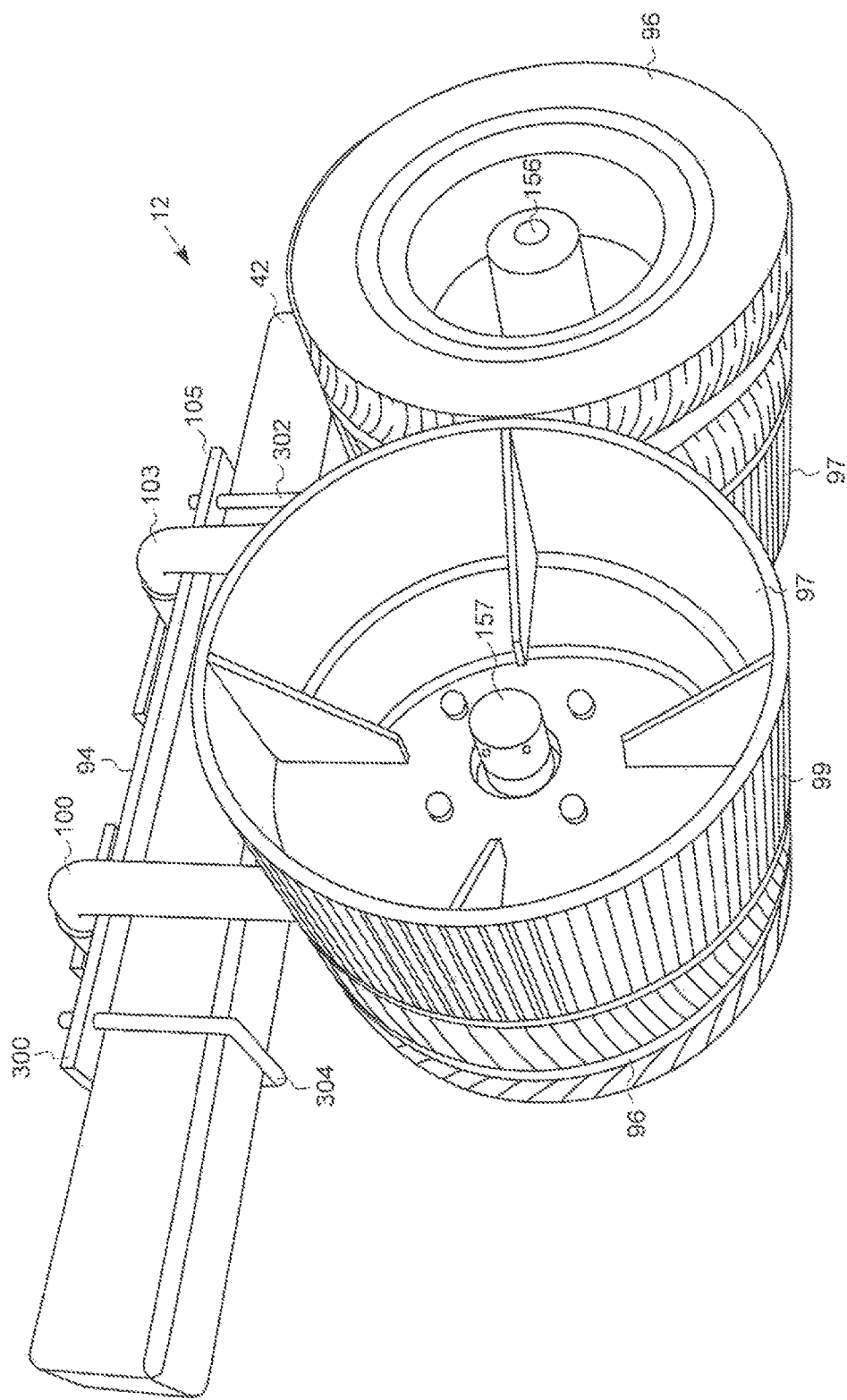
FIG. 13 is a front view of a preferred embodiment of the invention generally depicting a new and non-obvious weed pulling assembly utilizing a rubber tire and hard metal roller covered in a lagging material.
Figure 14:
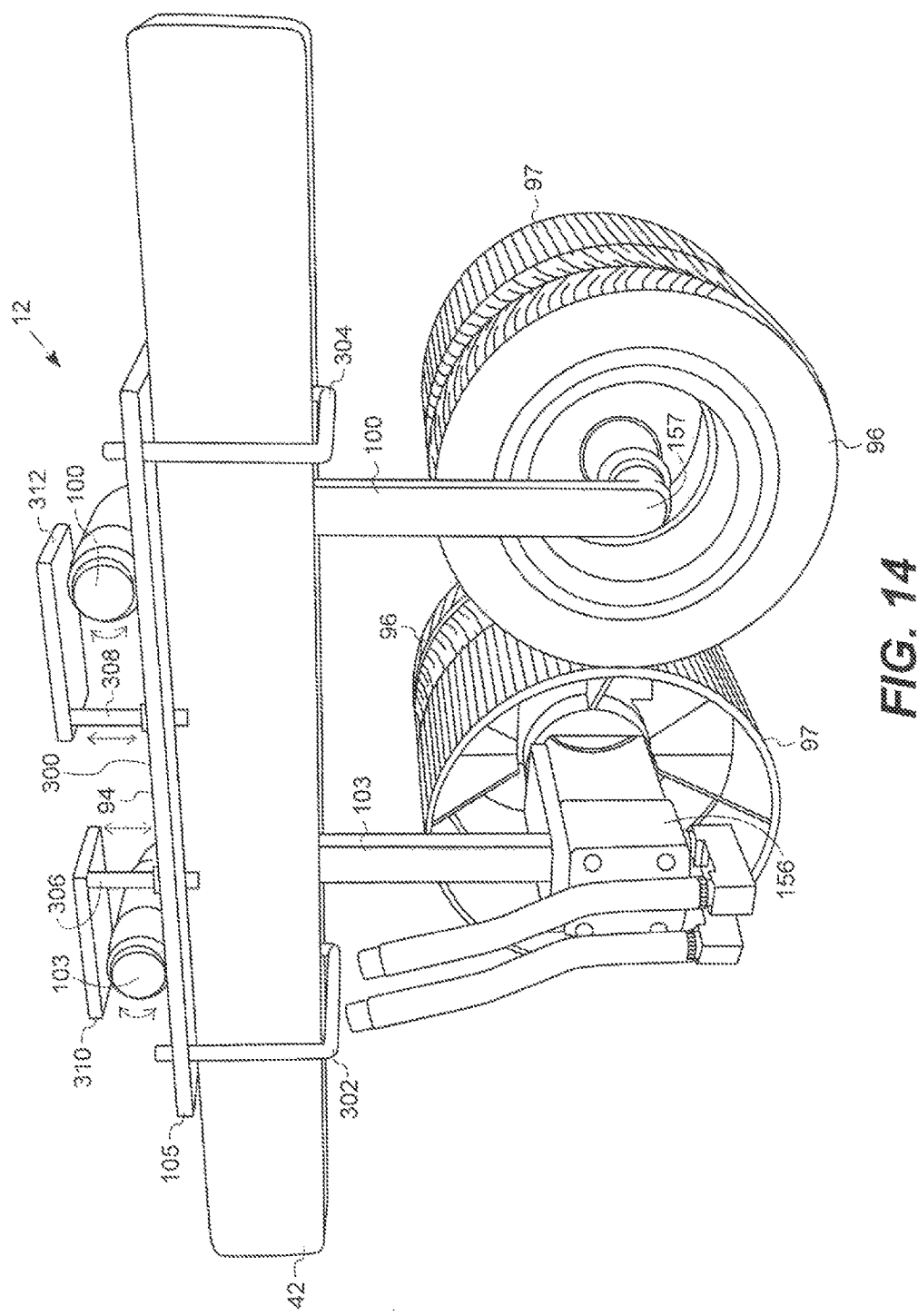
FIG. 14 is the rear view of the embodiment depicted in FIG. 13 generally depicting the weed pulling assembly from behind.

Now generally referring to the drawings and more in particular FIG. 13, the figure generally depicts a first roller 97 backed by a first rubber tire and or wheel member 96 on a non-powered shaft 157 and second wheel member 96 backed by second roller 97 on a powered shaft 156 to form weed pulling assembly 94. FIG. 14 is generally the back view of the same embodiment depicted in FIG. 13 wherein the back of power shaft or source 156 for powering rotation is shown and back of non-powered shaft 157 is also shown.

It is also contemplated that weed pulling assemblies 94 generally comprises the cooperation of wheel member 96, such as but not limited to an inflatable rubber tire, with a harder member, such as but not limited to metal roller 97 wherein the wheel member 96 rotates in an opposite rotation from roller 97 such that weed member 148 enters between wheel member 96 and roller 97 and is pulled up such that weed member 148 (as depicted in FIG. 3) is removed from the ground as it is pulled through the engaged rotating wheel member 96 and roller 97. In a preferred construction, roller 97 is made from a hard material such as metal and has a cover 99. In a preferred construction, the cover 99 is lagging made of soft rubber. The rubber may be the same as found on conveyor belts, attached to the roller and turns, powering the conveyor belt. It is still further contemplated to widen the cover 99 past the roller 97. In a preferred construction, roller 97 cover 99 extends ¼ inch beyond the metal roller 97. It is understood that the overhang may be more or less. The material extending forward beyond the metal roller 97 may be serrated or notched. The purpose of this serrated material is to improve the ability of the drum roller to gather in weeds.

Another new and non-obvious improvement over the prior art as depicted in FIG. 13 and FIG. 14 is the connection system to the support member beam referred to as tube member 42. Wherein the prior art generally utilized lock arm assemblies 46 secured to opposite ends of tube member 42 as generally depicted in FIG. 12, the current invention does away with the lock arm assemblies 46 as well as the fixed positioning required along tube member 42 support arm assembly 100. These prior art devices did not allow for variation of the number of pulling assemblies, the distance between the support arm assembly 100, nor allow for the individual support arms to be biased as desired, which will be explained in more detail below.

Each weed pulling assembly 94 may now generally compromise first roller 97 backed by first wheel member 96 on non-powered shaft 157 supported by first support arm assembly 100 and second wheel member 96 backed by second roller 97 on powered shaft 156 on a second support arm assembly 103. First support arm assembly 100 and second support arm assembly 103 are selectively attached as desired and spaced along tube member 42 by bracket system 105.

Bracket system 105 generally allows for the selective placement and ability to change the placement as desired along tube member 42 that did not exist in the prior art devices. This allows for numerous spacing options, numerous configurations and numbers of weed pulling assemblies 94 and so forth. Although one weed pulling assembly 94 is depicted in FIG. 13 and FIG. 14, it is understood that more may be utilized per tube member 42.

Bracket system 105 may comprise plate 300 that may be removably attached to tube member 42. A preferred embodiment may use U bolts 302 and 304 as depicted in FIG. 13 and attaches. First support arm assembly 100 and second support arm assembly 103 are generally pivotally attached to plate 300 allowing for the relative positioning and engagement of the rotating wheel members 96 and rollers 97. A first adjustment set screw 306 and a second adjustment set screw 308 allow for the selective positioning of support arm assembly 103 and support arm assembly 100, respectively.

First adjustment set screw 306 generally connects plate 300 to bar 310 wherein bar 310 is generally attached to support arm assembly 103. Second adjustment set screw 308 generally connects plate 300 to bar 312 wherein bar 312 is generally attached to support arm assembly 100. By lengthening first adjustment set screw 306 such that the distance between plate 300 and first adjustment set screw 306 connection point to bar 310 increases, bar 310 pivots thereby moving support arm assembly 103 toward support arm assembly 100. By shortening first adjustment set screw 306, the distance between plate 300 and first adjustment set screw 306 connection point to bar 310 is decreased and pivots thereby moving support arm assembly 103 away from support arm assembly 100.

It is also understood that by lengthening second adjustment set screw 308 such that the distance between plate 300 and second adjustment set screw 308 connection point to bar 312 increases, bar 312 pivots thereby moving support arm assembly 100 toward support arm assembly 103. By shortening first adjustment set screw 306, the distance between plate 300 and first adjustment set screw 306 connection point to bar 312 is decreased and pivots thereby moving support arm assembly 100 away from support arm assembly 103.

It is also contemplated that support arm assembly 100 and support arm assembly 103 may be spring loaded. This may provide for an adjustable and or constant loaded tension between support arm assembly 100 and support arm assembly 103 and respectively between roller 97 and wheel member 96.

Still furthermore, the current invention may utilize a gathering snout for generally pushing weeds together before engaging the wheel and roller. This may allow for weeds that are, by example, 10 inches apart to be pushed together before the engagement of the wheel and roller. It is also contemplated to synchronize the speed of the tractor with the rotation of the weed pulling assembly wherein the faster the tractor moves forward, the faster the spinning of the weed pulling apparatus. Conversely, the slower the tractor, the slower the spinning may be and so forth.

Another Preferred Embodiment

Figure 15:
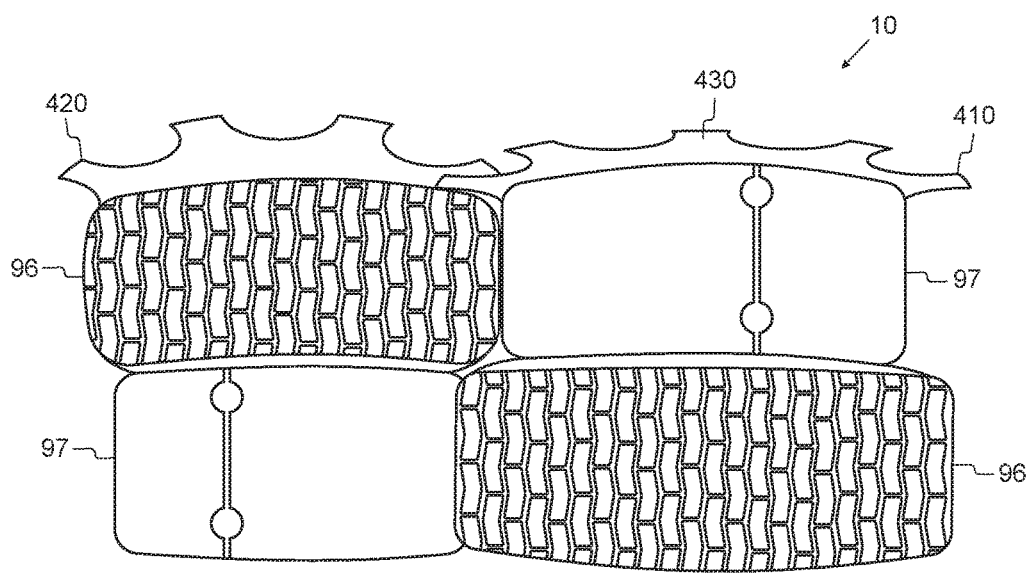
FIG. 15 is a general top view illustration of a preferred embodiment of the invention generally depicting a new and non-obvious weed pulling assembly utilizing a rubber tire and hard metal roller covered in a lagging material and a posi-pull system.
Figure 16:
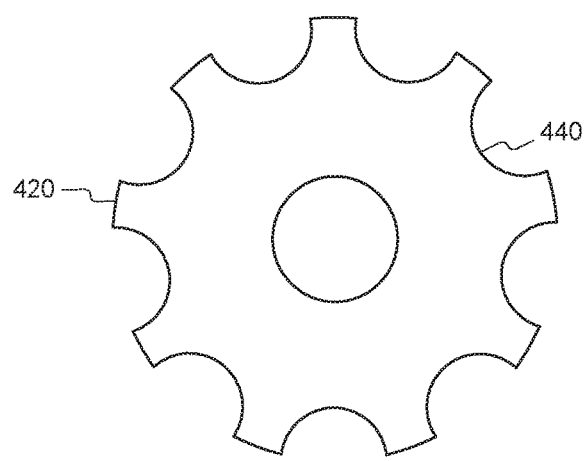
FIG. 16 is a general partial front view of a posi-pull disc system illustration of a preferred embodiment of the invention.

Once again referring to the illustration and more in particular FIGS. 15 and 16, invention 12 still further contemplates that roller 97 may be of a smaller circumference and or diameter than wheel member 96. This may provide a non-linear path for the weeds to be pulled through which may provide greater power for pulling without cutting the weed. The diameter difference may be several inches, 4 inches, greater than 4 inches and less than 4 inches.

Invention 12 further contemplates providing a first disc 410 to roller 97 and a second disc 420 to wheel member 96. The addition of first disc 410 and second disc 420 may be utilized for a posi-pull system 430 and or kit. The addition of first disc 410 and second disc 420 may provide for the removal of still un-pulled weeds that may have not been removed by the wheel member 96 and roller 97 action. It is known that some weeds become more resistant to pesticides such as but not limited to ROUNDUP resistant pigweed in soils hit by a summer's drought.

The addition of posi-pull system 430 provides a more aggressive pull for weeds in more severe conditions where it is found that pulling the weeds is more difficult. Invention 12 contemplates that the addition of posi-pull system 430 helps grip the weed as it is being pulled when added to wheel member 96 and roller 97 and may clamp on to the weed to pop it out of the ground.

First disc 410 and second disc 420 may include notches 440 and blades 450 that may further the pulling and gripping action. First disc 410 and second disc 420 may be made of steel, portions of steel, composite materials, combinations thereof and so forth.

Notches 440 may provide a gripping action and are not designed for cutting in a preferred embodiment. In a preferred construction, first disc 410 may be a generally flat coulter and second disc 420 may be a generally curved rear blade. Posi-pull system 430 may approximately double the effective gathering width in each row area and may provide a more uniform feed to the pulling wheels. It is contemplated that posi-pull system 430 provides that the weed is grabbed between the notches 440 on a flat coulter first disc 410 and curved rear blade second disc 420. This may not only grab the weed, but it distorts the stem of the weed increasing the holding power of the notches 440.

It is contemplated that if a stem is held taught between the ground and the weed pulling roller 97 and wheel member 96, and a sideways pressure is applied, it may double the effective pulling power. This may be accomplished by mounting a posi-pull system 430 that may utilize a curved disc with a bigger diameter to the back of the wheel member 96 and or roller 97. It is contemplated that the curved disc faces backwards so as not to cut the stem but still provides a sideways pressure.

It is contemplated notches 440 tend to have a longer pulling stroke, which does a better job of thoroughly dislodging the roots from the ground. The notches 440 may also tend to deliver the weed to the row middle.

Invention 12 has been operated in a field of weeds that had been grazed, leaving long slender stocks. When moving through the field, it was possible to see the weed being gathered and moved methodically through the wheels, then a sudden blip, and the weed is popped out of the ground. It was obvious the instant when the notched coulter caught the weed. Furthermore, with the more positive feed of the weeds through the notched blade, the tires may remain dryer and consequently do a better job of pulling. It has also been observed that the pulling blades reduce the amount of stalling of the wheels. It is also contemplated that invention 12 may be self-propelled and not generally attached to a tractor.

Invention 12, therefore, contemplates a weed puller apparatus adapted to be connected to a vehicle such as a farm tractor to be pulled through a crop having weed members therein to be removed, comprising a main support member beam connected to the farm tractor; a weed pulling assembly adjustably connected to said main support member beam having a first support arm wherein said first support arm includes a support shaft assembly rotatably connected at one end to a first rubber tire having a diameter, a first metal roller having a diameter, and a first disc having a diameter and a serrated circumference and a second end pivotally connected to said main support member beam and a second support arm wherein said second support arm includes a support shaft assembly rotatably connected at one end to a second metal roller having a diameter, a second rubber tire having a diameter, a second disc having a diameter and a serrated circumference and a second end pivotally connected to said main support member beam; wherein said first rubber tire and said second metal roller are in frictional contact, said second rubber tire and said first metal roller are in frictional contact, and said first disc and said second disc are in frictional contact; wherein said first rubber tire said diameter and said second rubber tire said diameter are respectively four inches larger than said first metal roller said diameter and said second metal roller said diameter; wherein said first disc said diameter and said second disc said diameter are respectively larger than said first rubber tire said diameter; a power source connected to one of said support shaft assembly to drive one of said first rubber tire, said second metal roller, and said first disc or said first metal roller, said second metal roller, and said second disc which, in turn, drives the remaining one of said first rubber tire, said second metal roller, and said first disc or said first metal roller said second metal roller, and said second disc in frictional contact to operably grasp said weed members to pull upwardly out of the supporting soil. It is also contemplated that said first metal roller and said second metal roller are covered with a rubber lagging.

Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

I claim:

1. A weed puller apparatus adapted to be connected to a farm tractor to be pulled through a crop having weed members therein to be removed, comprising:
    a main support member beam connected to the farm tractor;
    a weed pulling assembly adjustably connected to said main support member beam having a first support arm wherein said first support arm includes a first support shaft assembly rotatably connected at one end to a first rubber tire having a first diameter, a first metal roller having a second diameter, and a first disc having a third diameter and a serrated circumference and a second end pivotally connected to said main support member beam and a second support arm wherein said second support arm includes a second support shaft assembly rotatably connected at one end to a second metal roller having a fourth diameter, a second rubber tire having a fifth diameter, a second disc having a sixth diameter and a serrated circumference and a second end pivotally connected to said main support member beam;

wherein said first rubber tire and said second metal roller are in frictional contact, said second rubber tire and said first metal roller are in frictional contact, and said first disc and said second disc are in frictional contact;

wherein said first rubber tire said first diameter and said second rubber tire said fourth diameter are respectively larger than said first metal roller said second diameter and said second metal roller said fifth diameter;

wherein said first disc said third diameter and said second disc said sixth diameter are respectively larger than said first rubber tire said first diameter; and a power source connected to one of said first support shaft assembly or said second support shaft assembly to respectively drive one of said first rubber tire, said second metal roller, and said first disc or said first metal roller, said second metal roller, and said second disc which, in turn, drives the remaining one of said first rubber tire, said second metal roller, and said first disc or said first metal roller said second metal roller, and said second disc in frictional contact to operably grasp said weed members to pull upwardly out of the supporting soil.

2. The apparatus of claim 1 wherein said first metal roller and said second metal roller are covered with a rubber lagging.

* * * * *